US010938730B2

(12) United States Patent
Smith et al.

(10) Patent No.: US 10,938,730 B2
(45) Date of Patent: Mar. 2, 2021

(54) DATA TRANSMISSION TECHNIQUES BETWEEN SYSTEMS HAVING DIFFERENT COMMUNICATION SPEEDS

(71) Applicant: EMC IP Holding Company LLC, Hopkinton, MA (US)

(72) Inventors: Erik P. Smith, Douglas, MA (US); Massarrah N. Tannous, Milford, MA (US); Jean E. Pierre, Brockton, MA (US); Richard Isaac, Stoughton, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 16/260,499

(22) Filed: Jan. 29, 2019

(65) Prior Publication Data
US 2020/0244583 A1 Jul. 30, 2020

(51) Int. Cl.
*H04L 12/825* (2013.01)
*G06F 13/38* (2006.01)
*H04L 12/815* (2013.01)

(52) U.S. Cl.
CPC ............ *H04L 47/25* (2013.01); *G06F 13/385* (2013.01); *H04L 47/22* (2013.01)

(58) Field of Classification Search
CPC ....... H04L 47/25; H04L 47/22; G06F 13/385; G06F 13/20; G06F 2213/0008; G06F 2213/0036
See application file for complete search history.

(56) References Cited

U.S. PATENT DOCUMENTS

| 7,773,521 B2 * | 8/2010 | Zhang | H04L 41/0896 370/229 |
| 7,930,481 B1 * | 4/2011 | Nagler | G06F 12/0804 710/18 |
| 8,811,183 B1 * | 8/2014 | Anand | H04L 49/25 370/237 |

(Continued)

OTHER PUBLICATIONS

Universal Serial Bus Specification Revision 2.0. Apr. 27, 2000 (Year: 2000).*

(Continued)

*Primary Examiner* — Stephen J Clawson
(74) *Attorney, Agent, or Firm* — Muirhead and Saturnelli, LLC

(57) ABSTRACT

Techniques for transmitting data may include: receiving, at a host, an initiator data transfer rate indicating a communication rate at which an initiator port of the host communicates over a first path using a communications fabric with a target port of a data storage system; receiving, at the host, a target data transfer rate indicating a communication rate at which the target port of the data storage system communicates over the first path using the communications fabric with the initiator port of the host; determining, at the host, whether the initiator data transfer rate and the target data transfer rate are different; and responsive to determining that the initiator data transfer rate and the target data transfer rate are different, performing processing that limits a rate at which data is transmitted between the initiator and target ports in accordance with the initiator and target data transfer rates.

19 Claims, 9 Drawing Sheets

(56) References Cited

U.S. PATENT DOCUMENTS

| | | | | |
|---|---|---|---|---|
| 8,935,493 | B1* | 1/2015 | Dolan | G06F 3/0649 |
| | | | | 711/117 |
| 9,544,237 | B1* | 1/2017 | Lo | H04L 47/12 |
| 2009/0080334 | A1* | 3/2009 | DeCusatis | H04L 47/25 |
| | | | | 370/237 |
| 2015/0278148 | A1* | 10/2015 | Sindhu | H04L 47/6215 |
| | | | | 710/302 |
| 2015/0280939 | A1* | 10/2015 | Sindhu | H04L 12/4641 |
| | | | | 370/236 |
| 2017/0168986 | A1* | 6/2017 | Sajeepa | G06F 15/17331 |
| 2019/0081900 | A1* | 3/2019 | Peleska | H04L 1/0021 |
| 2019/0107956 | A1* | 4/2019 | Kachare | G06F 9/4411 |
| 2019/0109792 | A1* | 4/2019 | Seely | H04L 47/125 |
| 2020/0110717 | A1* | 4/2020 | Vokaliga | G06F 13/20 |

OTHER PUBLICATIONS

Deepak Vokaliga, et al., "Data Transmission Techniques Between Systems Having Different Communication Speeds," U.S. Appl. No. 16/155,305, filed Oct. 9, 2018.

* cited by examiner

DATA TRANSMISSION TECHNIQUES BETWEEN SYSTEMS HAVING DIFFERENT COMMUNICATION SPEEDS

BACKGROUND

Technical Field

This application generally relates to data transmission between systems or components operating at different communication speeds.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of techniques herein is a method of transmitting data comprising: receiving, at a host, an initiator data transfer rate indicating a communication rate at which an initiator port of the host communicates over a first path using a communications fabric with a target port of a data storage system; receiving, at the host, a target data transfer rate indicating a communication rate at which the target port of the data storage system communicates over the first path using the communications fabric with the initiator port of the host; determining, at the host, whether the initiator data transfer rate and the target data transfer rate are different; and responsive to determining that the initiator data transfer rate and the target data transfer rate are different, performing first processing that controls and limits a rate at which data is transmitted between the initiator port and the target port in accordance with the initiator data transfer rate and the target data transfer rate. The method may include determining whether the initiator data transfer rate is greater than the target data transfer rate; and responsive to determining the initiator data transfer rate is greater than the target data transfer rate, performing second processing by the host that controls and limits, in accordance with the target data transfer rate, a rate at which data is transmitted from the host initiator port to the target port over the first path using the communications fabric. The method may include issuing, from the initiator port of the host to the target port of the data storage system over the first path using the communications fabric, one or more write operations that stores write data on a storage device of the data storage system. The second processing may include the host limiting and controlling, in accordance with the target data transfer rate, a rate at which the one or more write I/O operations and an amount of the write data written by the one or more write I/O operations are transmitted from the initiator port of the host to the target port of the data storage system over the first path using the communications fabric. The host may sends the one or more write I/O operations at a frequency whereby an average write data transfer rate of the write data written by the one or more write I/O operations may not exceed the target data transfer rate. The second processing may include partitioning a first of the one or more write I/O operations that writes first data having a first size into multiple write I/O operations each of a smaller size than the first size; and issuing the multiple write I/O operations, from the initiator port of the host to the target port of the data storage system over the first path using the communications fabric, at a selected frequency whereby an average write data transfer rate of the first data written by the multiple write I/O operations does not exceed the target data transfer rate. The method may include determining whether the target data transfer rate is greater than the initiator data transfer rate; and responsive to determining the target data transfer rate is greater than the initiator data transfer rate, performing second processing by the host that controls and limits, in accordance with the initiator data transfer rate, a rate at which data is transmitted from the target port to the host initiator port over the first path using the communications fabric. The method may include issuing, from the host to the data storage system, a command that sets a bandwidth limit parameter of the data storage system to the initiator data transfer rate, wherein the bandwidth limit parameter denotes a rate at which data is transmitted from the target port of the data storage system to the initiator port of the data storage system over the first path using the communications fabric. The method may include issuing, from the initiator port of the host to the target port of the data storage system over the first path using the communications fabric, one or more read operations that read data from a storage device of the data storage system. The second processing may include the data storage limiting and controlling, in accordance with the initiator data transfer rate, a rate at which the read data read by the one or more read I/O operations is transmitted from the target port of the data storage system to the initiator port of the host over the first path using the communications fabric. An average read data transfer rate at which the data storage system sends the read data, from the target port of the data storage system to the initiator port of the host over the first path using the communications fabric, may not exceed the initiator data transfer rate. The data storage system may perform processing to ensure that the average read data transfer rate does not exceed the initiator data transfer rate. The processing may include any one or more of: controlling a frequency at which portions of the read data are returned to the initiator port, and controlling an amount of the read data returned in a single transmission to the initiator port. The method may include determining, by the host, whether there has been a state change with respect to the communications fabric used for communications between the host and data storage system; and responsive to determining there has been a state change with respect to the communications fabric used for communications between the host and data storage system, performing other processing by the host including: receiving, at the host, a first revised value for the initiator data transfer rate and a second revised value for the target data transfer rate; determining, at the host, whether the first revised value and the second revised value are different; and responsive to determining that the first revised value and the second revised value are different, performing first processing that controls and limits a rate at which data is transmitted between the initiator port and the target port in accordance with the first revised value and the second revised value. The communications fabric may include a switch having memory used as a buffer for temporarily storing data transmitted between the host and the data storage system. The state change may include any of: adding a new initiator port of the host, adding a new target port of the data storage system, adding a new port of the switch, removing an existing initiator port of the host, removing an existing target port of the data storage system, removing an existing port of the switch, modifying a characteristic of an existing initiator port of the host, modifying a characteristic of an existing target port of the data storage system, modifying a characteristic of an existing port of the switch, a new login to the switch, a logout of the switch, and a component joining or leaving the communications fabric. The method may include receiving, by the data storage system, notification regarding the state change; and responsive to receiving the notification, performing processing on the data storage system to record information regarding the notification and associated state change, the information including a data and time of the state change. The step of determining, by the host, whether there has been a state change with respect to the communications fabric used for communications between the host and data storage system, may further include the host periodically polling the data storage system to determine whether there has been a state change with respect to the communications fabric. A multi-path I/O driver of the host may receive the initiator data transfer rate and the target data transfer rate. The multi-path I/O driver may perform said determining whether the initiator data transfer rate and the target data transfer rate are different. Responsive to determining that the initiator data transfer rate and the target data transfer rate are different, the multi-path I/O driver may control the first processing performed that controls and limits a rate at which data is transmitted between the initiator port and the target port in accordance with the initiator data transfer rate and the target data transfer rate.

In accordance with another aspect of techniques herein is a computer readable medium comprising code stored thereon that, when executed, performs a method of transmitting data comprising: receiving, at a host, an initiator data transfer rate indicating a communication rate at which an initiator port of the host communicates over a first path using a communications fabric with a target port of a data storage system; receiving, at the host, a target data transfer rate indicating a communication rate at which the target port of the data storage system communicates over the first path using the communications fabric with the initiator port of the host; determining, at the host, whether the initiator data transfer rate and the target data transfer rate are different; and responsive to determining that the initiator data transfer rate and the target data transfer rate are different, performing first processing that controls and limits a rate at which data is transmitted between the initiator port and the target port in accordance with the initiator data transfer rate and the target data transfer rate.

In accordance with another aspect of techniques herein is a system comprising: one or more processors; and a memory comprising code stored thereon that, when executed, performs a method of transmitting data comprising: receiving, at a host, an initiator data transfer rate indicating a communication rate at which an initiator port of the host communicates over a first path using a communications fabric with a target port of a data storage system; receiving, at the host, a target data transfer rate indicating a communication rate at which the target port of the data storage system communicates over the first path using the communications fabric with the initiator port of the host; determining, at the host, whether the initiator data transfer rate and the target data transfer rate are different; and responsive to determining that the initiator data transfer rate and the target data transfer rate are different, performing first processing that controls and limits a rate at which data is transmitted between the initiator port and the target port in accordance with the initiator data transfer rate and the target data transfer rate.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
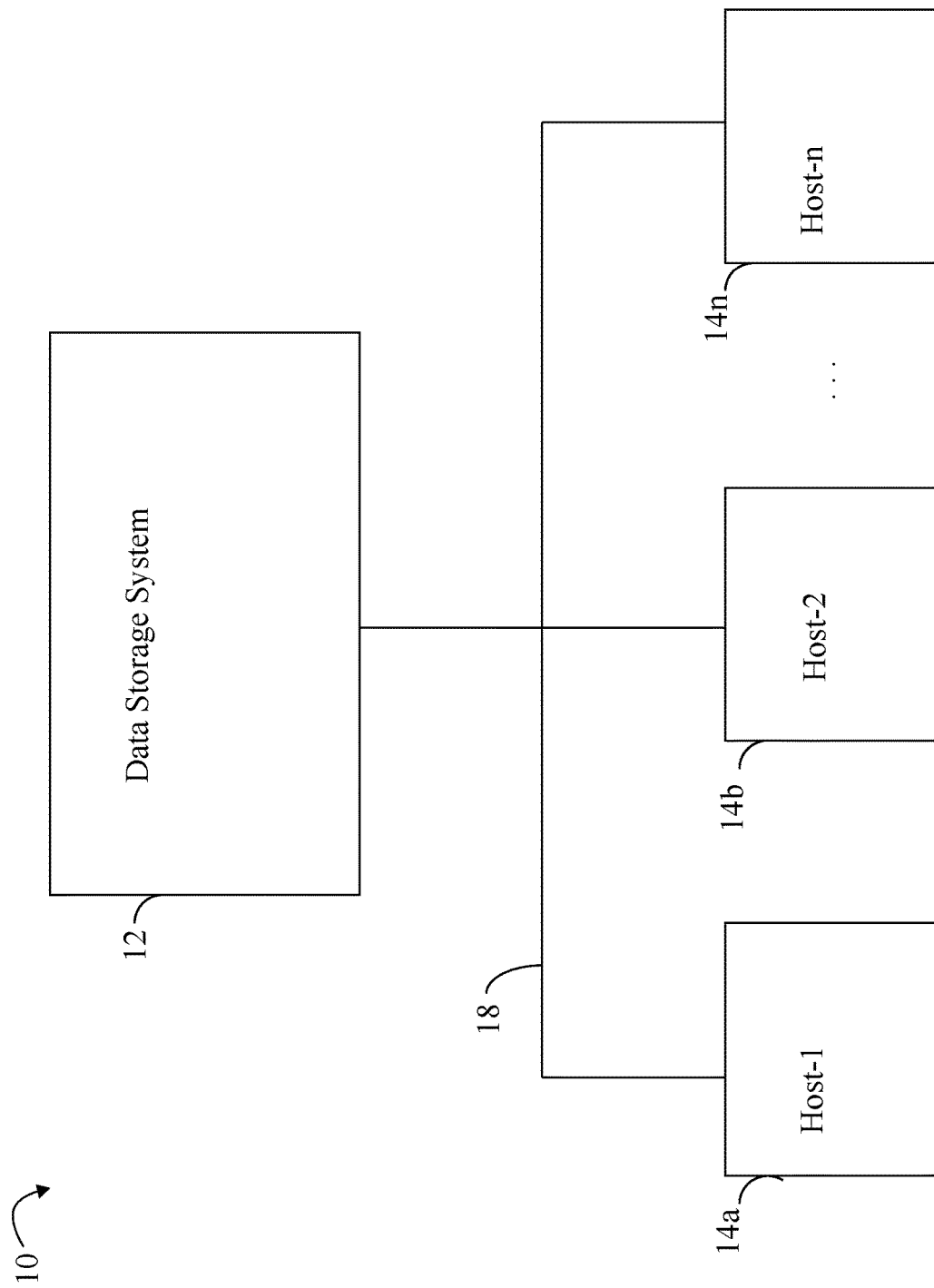
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
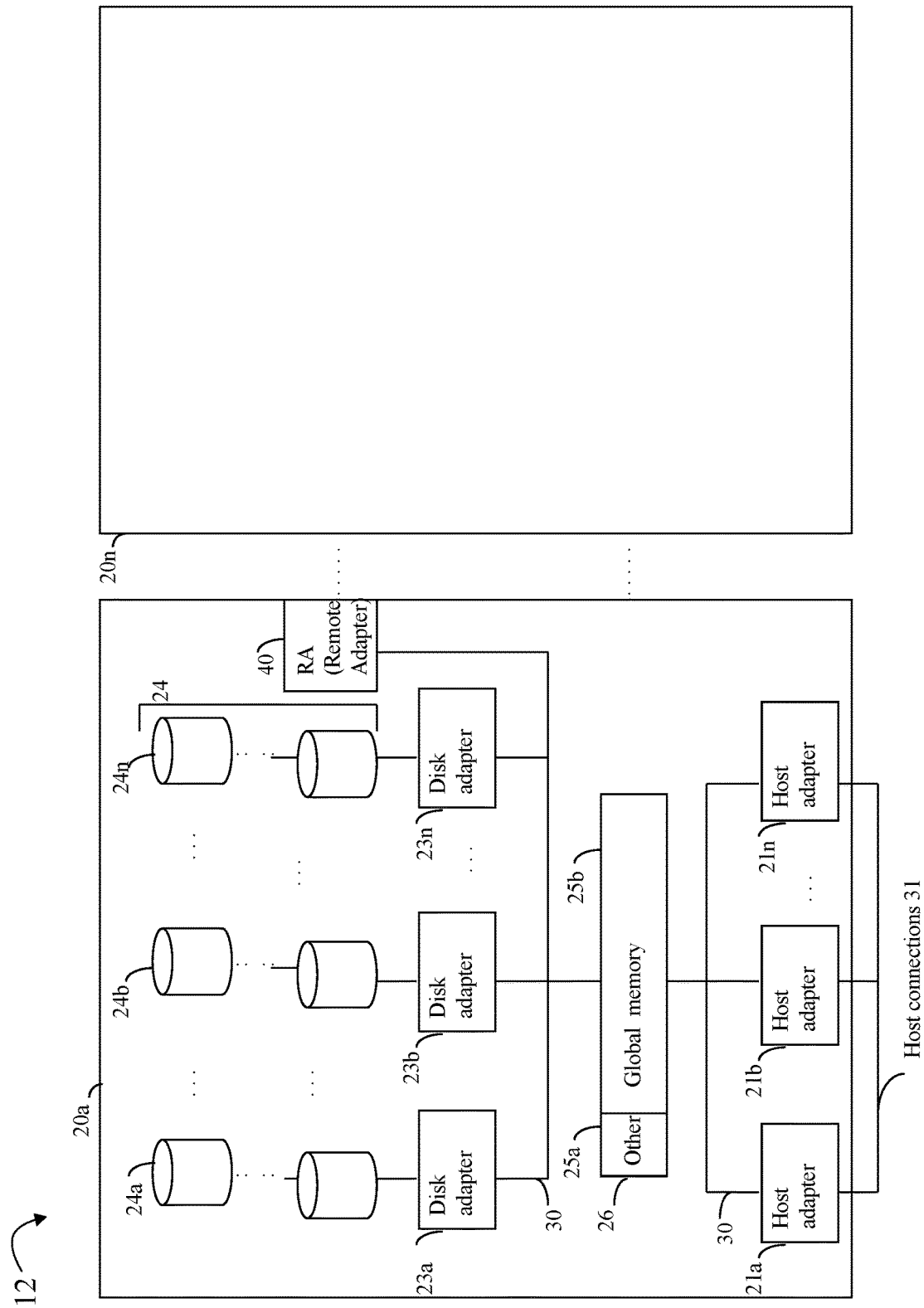
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
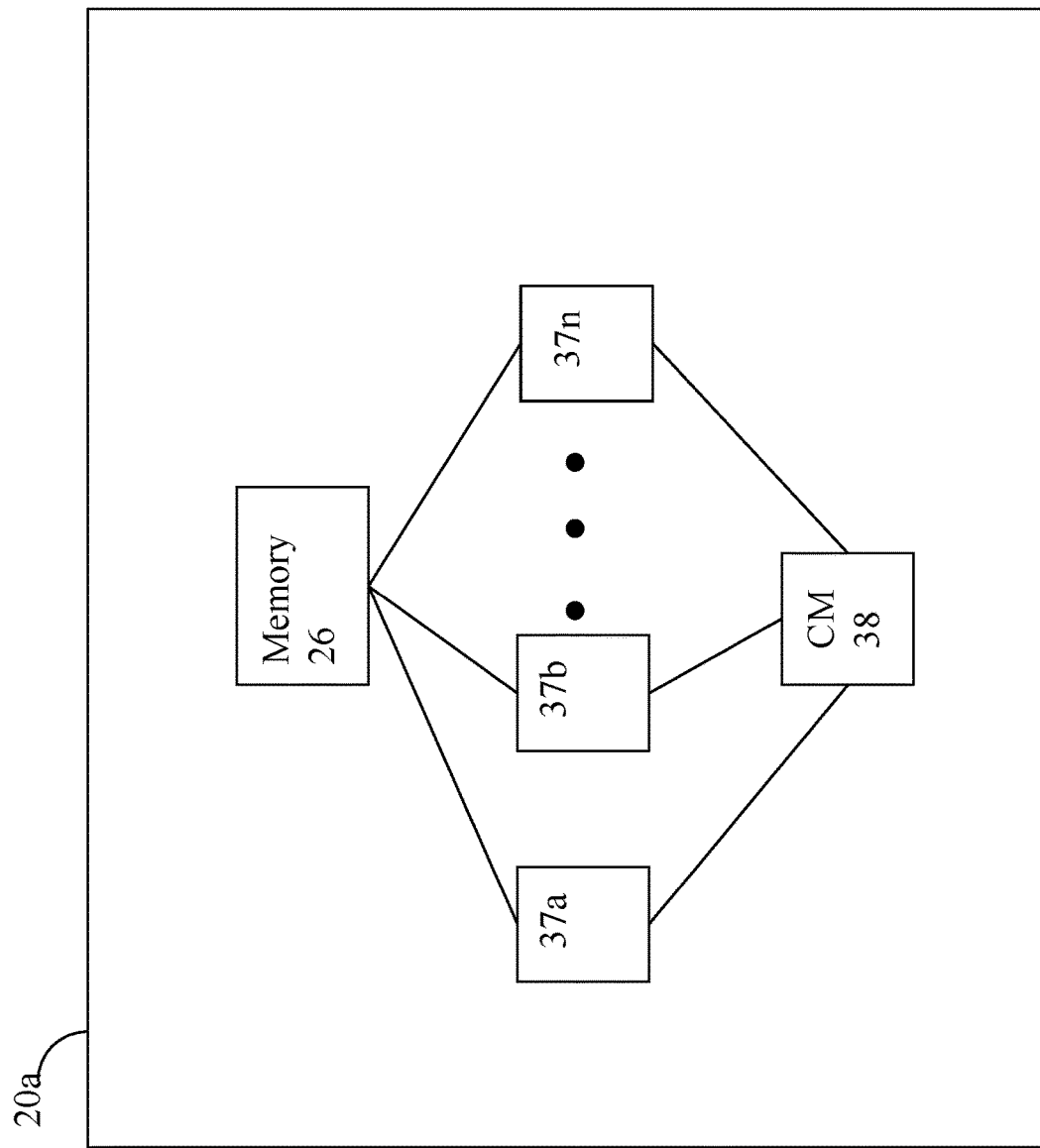
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
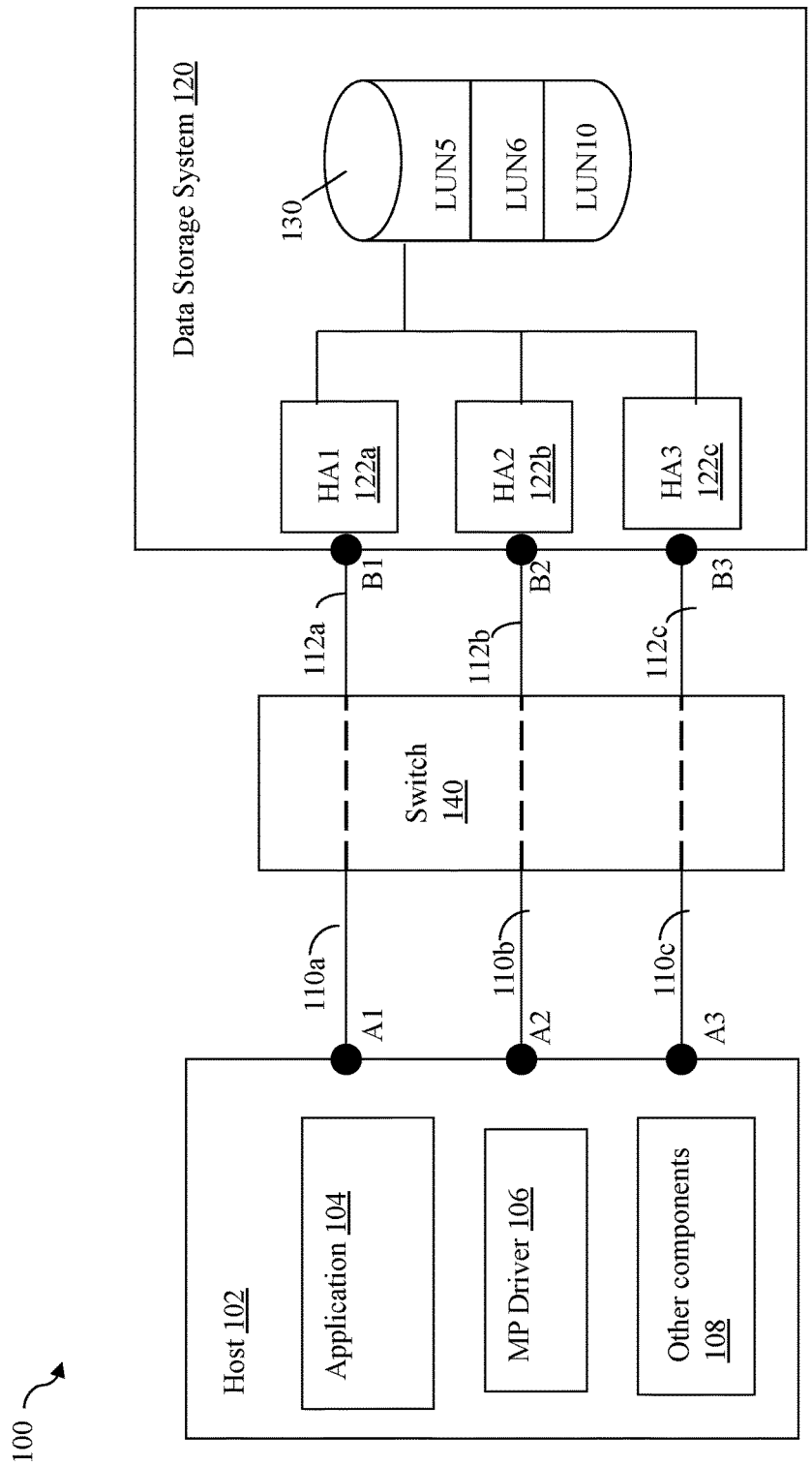
FIGS. 3 and 6 are examples of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
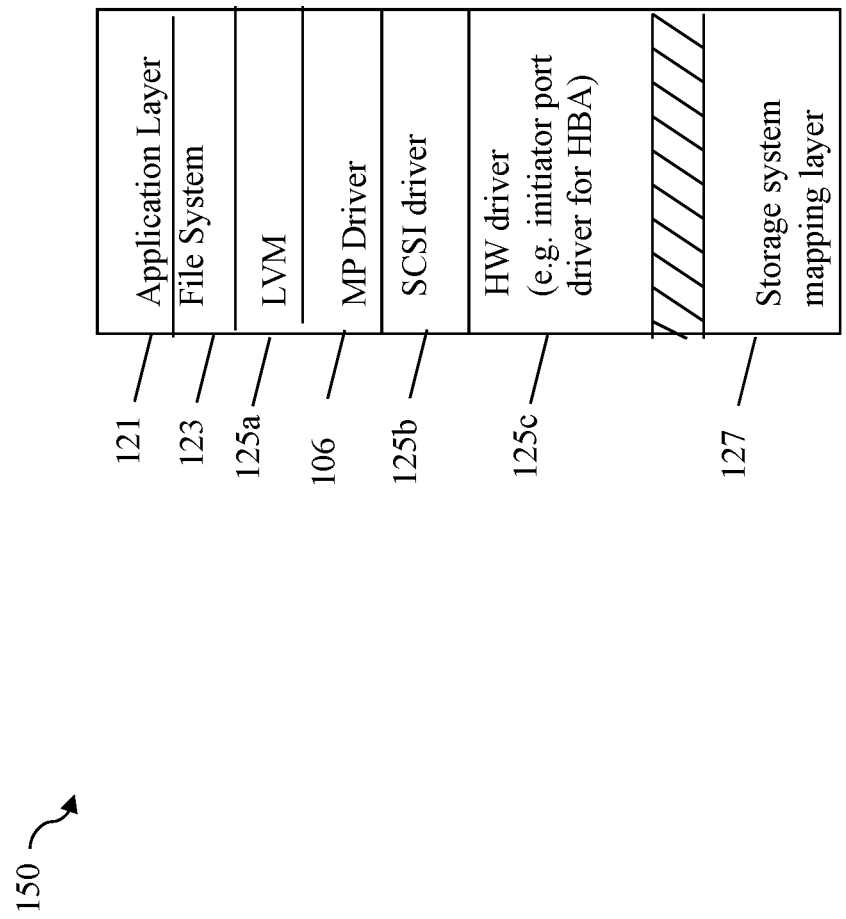
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs of the data storage system and their target ports with additional filtering or access control information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide names (WWNs) of host interfaces (e.g., host initiator ports) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new connections.

Thus, zoning may be generally characterized as defining logical connections providing connectivity between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the one or more switches (e.g., switching or network fabric) is performed to define connectivity between the host(s) and data storage system(s). In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWN and the masking information identifies which initiator WWNs are allowed to access particular LUNs on each target port WWN of the data storage system. In the MV for a host, the IG may identify the WWNs of host initiators and the PG may identify the WWNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5:
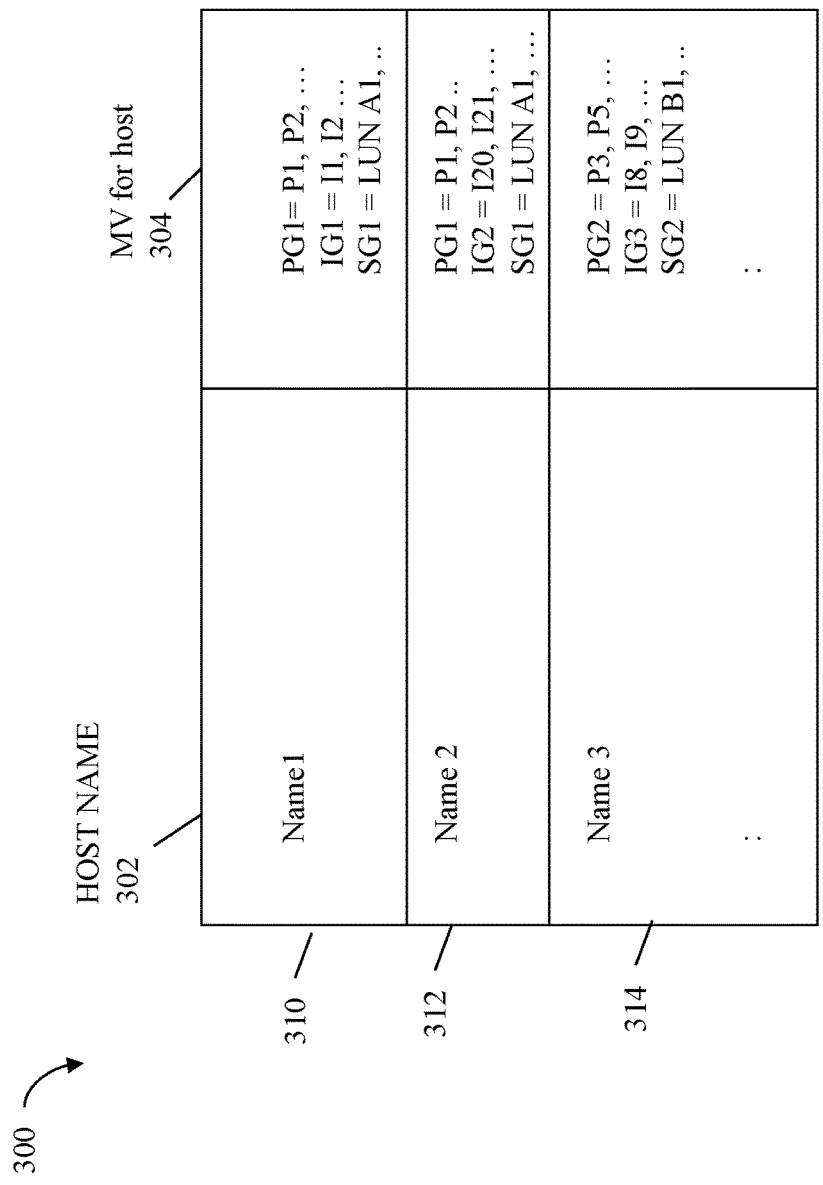
FIG. 5 is an example of information that may be included in a masking view defined for hosts in an embodiment in accordance with techniques herein.

Referring to FIG. 5, shown is an example of masking information that may be created and used in an embodiment in accordance with techniques herein. In the example 300, shown is a table of MVs for a plurality of hosts. Each row of the table denotes an MV instance in column 304 configured for a particular host identified in column 302 of the same row. The table 300 may index or provide access to MVs using the host's unique HOST NAME (column 302) as described elsewhere herein. For example, consider an embodiment in which the table 300 is indexed and accessed by HOST NAME in column 302. (e.g., Each host's HOST NAME denoted in column 302 uniquely identifies a particular host). Generally, the example 300 uses the notation PGn, n being an integer greater than 0, to identify an instance of a PG; uses the notation IGn to identify and instance of an IG; and uses the notation SGn to identify an instance of a SG. In a PG, Pn may denote a target port WWN. In an IG, In may denote an initiator port WWN.

Row 310 may denote a first host having a HOST NAME of Name 1 (as in column 302 of row 310) with an MV as specified in column 304 of row 310. As illustrated in column 304 of row 310, the first host has a first MV including port group PG1, initiator group IG1, and storage group SG1. Row 312 may denote a second host having a HOST NAME of Name 2 (as in column 302 of row 312) with an MV as specified in column 304 of row 312. As illustrated in column 304 of row 312, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 310 and 312. Row 314 may denote a third host having a HOST NAME of Name 3 (as in column 302 of row 314) with an MV as specified in column 304 of row 314. As illustrated in column 304 of row 314, the third host has a third MV including port group PG2, initiator group IG3, and storage group SG2.

In at least one embodiment in accordance with techniques herein, the host may perform processing, such as when the host is booted, to discover and establish connectivity between the host and data storage system. In particular, the host may perform processing to discover and establish connectivity with the switch (e.g., more generally network or switching fabric) and also between the switch and data storage system. For example, an HBA initiator port of a host may log into the switch and provide identifying information of the initiator port, such as the initiator port's WWN. The switch may provide the initiator port with information regarding what data storage system target ports are visible or exposed from the switch. In turn, the host initiator port may then proceed to login to the target ports of the data storage system where the host initiator port provides its WWN along with possibly other configuration information, such as the HOST NAME, sent during the login.

Figure 6:
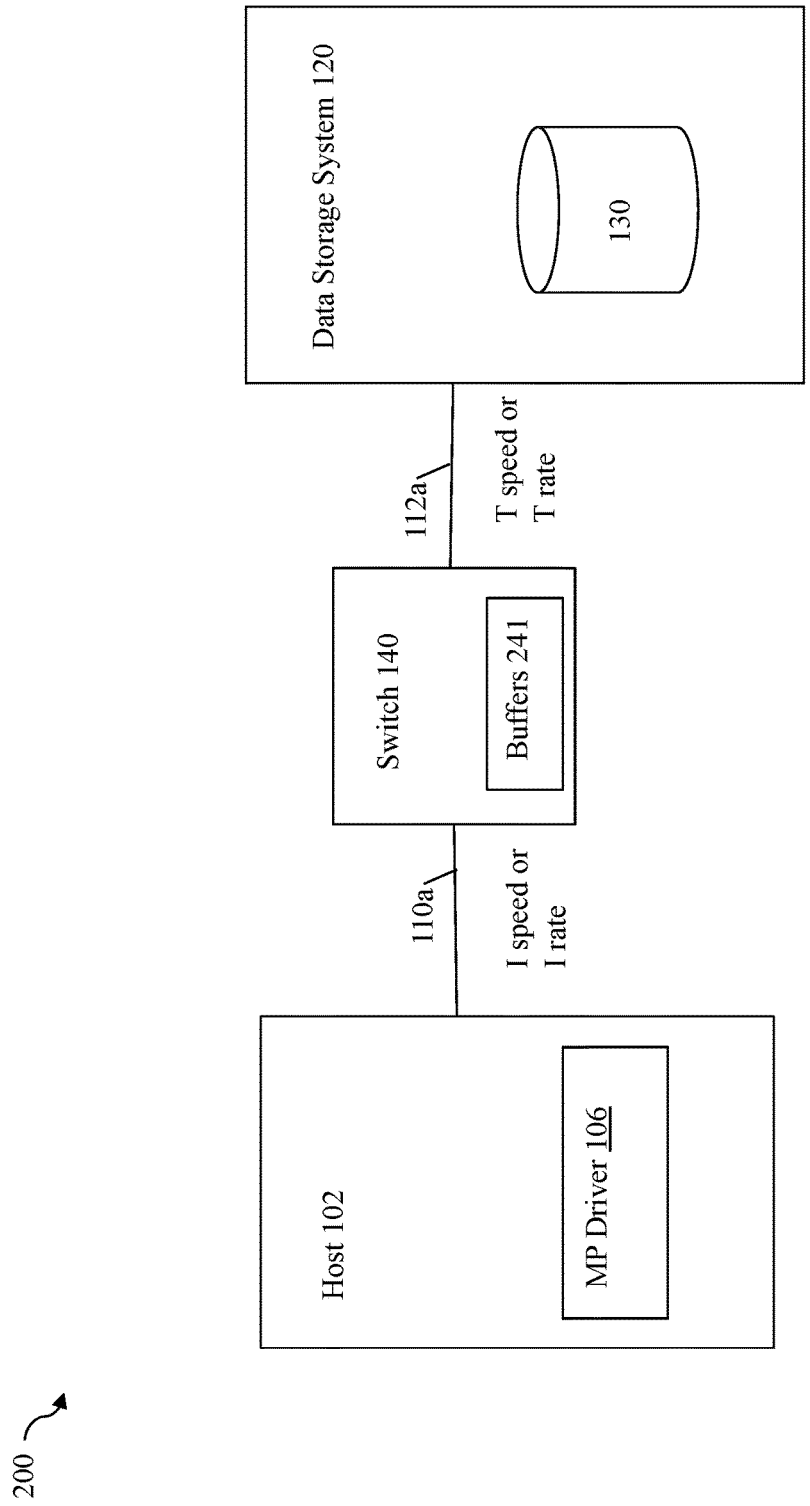

Referring to FIG. 6, shown is an example of an embodiment of a system that may be utilized in connection with techniques herein. The example 200 includes elements similarly numbered as in connection with FIG. 3 with additional detail omitted for simplicity of illustration.

The example 200 includes host 102, MP driver 106, switch 140 and data storage system 120. The host 102 and data storage system 120 may communicate over one or more paths through the switch 140. Element 110a denotes a connection between the host 102 and switch 140. Element 112a denotes a connection between the data storage system 120 and the switch 140. Element 130 may represent one of more physical storage devices of the data storage system 120, such as one or more of a rotating disk drive, flash-based or other solid state storage device, and the like, where the one or more physical storage devices 130 may be configured to include logical devices or LUNs, such as previously described, for example, in connection with FIG. 3. It should be noted that the example 200 includes only a single host, a single data storage system, and a fabric including a single switch for purposes of simplicity to illustrate the techniques herein. However, systems implementing techniques herein may including multiple hosts, multiple data storage systems, additional components besides the switch in the communication or switching fabric, and the like.

It should be noted that following paragraphs and examples may refer to particular examples using switch 140 having a switching fabric, for simplicity of illustration. Element 140 may be a single switch having a switching fabric, a multi-switch having a multi-switch fabric and the like. Thus, element 140 may more generally denote a communications fabric such as a network having its own connectivity fabric or network fabric where the network may include one or more components, such as one or more switches, providing the connectivity between the host 102 and data storage system 120.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN having its physical storage provisioned on physical storage devices 130 of the data storage system 120. Consistent with discussion elsewhere herein, element 110a may be a connection from a port of host 102 to a port of the switch 140, and element 112a may be a connection from a port of the switch 140 to a port of the data storage system 120.

The host 102 may issue I/O commands (e.g., such as read and write I/O commands that read data from and/or write data to a LUN) to the data storage system 120 where such commands may be communicated over the connections 110a, 112a, through switch 140, forming the path between 102 and 120. The data storage system 120 may receive the I/O command, perform any needed processing to service the I/O command, and return a response, including any requested data, to the host 102. For a read command, the host 102 requests data that is returned by the storage system 120 to the host 102 over the path and its connections 110a, 112a. In particular, returned read data is sent over 112a from the data storage system 120 to the switch 140, and then over 110a from the switch 140 to the host 102. For a write command, the host 102 sends write data to the storage system 120 over the path and its connections 110a, 112a. In particular, write data is sent by host 102 over 110a to the switch 140, and then over 112a from the switch 140 to the data storage system 120 (whereby the data storage system then writes the write data to physical storage 130).

Generally, the switch 140 may include buffers 241 used to temporarily store data that is communicated between the host 102 and data storage system 120. Buffers 241 may be memory or any form of suitable physical storage capable of storing the data. For example, write data sent from the host 102 to data storage system 120 may first be sent (over 110a) from the host 102 to switch 140, where the write data is temporarily stored in a buffer of the switch 140. Subsequently, the write data stored in the buffer of the switch 140 is then sent (over 112a) to the data storage system 120. As another example, read data that is requested by the host 102 and returned/sent from data storage system 120 to the host 102 may first be sent (over 112a) from the data storage system 120 to switch 140, where the read data is temporarily stored in a buffer of the switch 140. Subsequently, the read data stored in the buffer of the switch 140 is then returned (over 110a) to the host 102.

The host 102 may negotiate a first communication rate or speed, such as a data transfer rate or data bandwidth rate, with the switch 140 denoting the speed or rate at which data is transmitted over connection or link 110a (between the switch 140 and host 102). In a similar manner, the data storage system 120 may negotiate a second communication rate or speed, such as a data transfer rate or data bandwidth rate, with the switch 140 denoting the speed or rate at which data is transmitted over connection or link 112a (between the switch 140 and data storage system 120). A slow drain problem, causing network congestion and reduced network and switch performance, may result in cases where there is a bandwidth or speed mismatch in connection with negotiated communication speeds of connections 110a and 112a. Generally, the connection or link having the faster communication rate or speed may consume an excessive amount of switch buffers. In particular, the switch through which communications are made between the host and data storage system may lack sufficient quality of service or controlling mechanisms that control and limit buffer consumption, for example, used for buffering message from any particular entity (e.g., port of a host or data storage system) connected thereto.

To further illustrate with reference to FIG. 6, assume the host 102 negotiates a first communication speed of 8 GBs per second with the switch 140 for data transmission over 110a, and the data storage system 120 negotiates a second communication speed of 16 GBs per second with the switch 140 for data transmission over 112a. The host 102 may issue read I/Os over 110a, 112a to data storage system 120. In response, the data storage system 120 may return requested read data to the host 102. In particular, the data storage system 120 transmits the requested read data at a speed or rate of 16 GBs/second over 112a to the switch 140 where the read data may be stored in buffers 241 until transmitted over 110a to the host 102. In one aspect, the read data may be characterized as "drained" from the switch 140 and transmitted over 110a to host 102 at the slower first communication speed of 8 GBs/second. In connection with such disparate or mismatched communication speeds of 16 GBs/second and 8 GBs/second, an excessive amount of read data may be buffered in the buffers 241 of the switch 140. Such conditions may result due to the data storage system 120 transmitting the read data over 112a to the switch 140 at 16 GBs/second, which is twice the rate at which the buffered read data in switch 140 is sent to the host 102 over 110a (having a communication speed or rate of 8 GBs/second). Generally such a scenario as just described illustrating the slow drain problem may result in cases where the buffered data in the switch is drained over 110a at a much slower speed or rate in comparison to the speed or rate at which the data is sent to the switch over 112a.

The slow drain problem may also occur where there is a relative communication rate or speed disparity between 110a and 112a where the communication speed or rate of 110a is larger than the communication speed or rate of 112a. To further illustrate with reference to FIG. 6, assume the host 102 negotiates a first communication speed of 16 GBs per second with the switch 140 for data transmission over 110a, and the data storage system 120 negotiates a second communication speed of 8 GBs per second with the switch 140 for data transmission over 112a. The host 102 may issue write I/Os over 110a, 112a to data storage system 120. In particular, the host 102 may send the write data over 110a to switch 140 at a rate of 16 GBs/second where the write data is stored in buffers 241 until transmitted to the data storage system 120 over 112a. In one aspect, the write data may be characterized as "drained" from the switch 140 and transmitted over 112a to data storage system 120 at the slower communication speed of 8 GBs/second. In connection with such disparate or mismatched communication speeds of 16 GBs/second (110a) and 8 GBs/second (112a), an excessive amount of write data may be buffered in the buffers 241 of the switch 140. Such conditions may result due to the host 102 transmitting the write data over 110a to the switch 140 at 16 GBs/second, which is twice the rate at which the buffered write data in switch 140 is sent to the data storage system 120 over 112a (having a communication speed or rate of 8 GBs/second). Generally such a scenario as just described illustrating the slow drain problem may result in cases where the buffered data in the switch is "drained" over 112a at a much slower speed or rate in comparison to the speed or rate at which the data is sent to the switch over 110a.

What will be described in following paragraphs are techniques that may be used to resolve and/or avoid slow drain scenarios, such as discussed above, which may occur due to a disparity or mismatch in the different communication speeds with which different entities, such as hosts and data storage systems, communicate with the network or communication fabric, such as the switch 140. The embodiment of FIG. 6 illustrates one embodiment in which techniques described in following paragraphs may be utilized between a host 102 and data storage system 120. More generally, techniques herein may be used between any two suitable entities having components capable of performing processing as described herein. Techniques in following paragraphs provide for automating the process of detecting the existence of the slow drain problem and also performing steps to solve the problem by reducing, controlling or limiting the communication speed or rate of the entity having the higher communication speed or rate. Techniques herein provide a host-based solution where the host performs processing to detect and resolve the slow-drain problem. In at least one embodiment, the MP driver 106 of the host may be used to control and drive processing of such techniques herein as will be described in more detail below.

Following paragraphs describe processing as may be performed in an embodiment as illustrated in FIG. 6 with a single path including the single link 110a between an initiator port of the host and switch, and the single link 112a between the switch and a target port of the data storage system. More generally, there may be multiple hosts, multiple such paths and sets of links such as illustrated in FIG. 3, and the like. In following paragraphs as denoted in FIG. 6, the I speed or I rate may denote the negotiated speed or rate of the link 110a, and the T speed or T rate may denote the negotiated speed or rate of the link 112a.

As a first step S1, the MP driver 106 of the host obtains the negotiated speed or rate I of the link 110a between the initiator port of the host and switch. In at least one embodiment, the MP driver 106 may gather such information by executing code in a component of the MP driver 106 that executes in a non-privileged or user mode (as opposed to a privileged or kernel mode). The component of the MP driver 106 may, for example, issue one or more commands to the operating system to obtain the negotiated speed or rate I of the link 110a between the host and switch.

As a second step S2, the MP driver 106 obtains the negotiated speed or rate T of the link 112a between the switch and the target port of the data storage system. In at least one embodiment, the MP driver 106 may issue a vendor unique (VU) SCSI command to the data storage system (e.g., over 110a, 140, 112a) to obtain the negotiated speed or rate T of the link 112a. The data storage system returns the requested negotiated speed or rate of 112a in response to the command. The VU SCSI command may be an additional VU command. As a variation, an additional VU page of information may be added to an existing command, such as the SCSI log sense command. For example, the host may send a SCSI log sense command over 110a, 112a through switch 140 to the data storage system 120 requesting that the system 120 return its operational information, such as the system 120's negotiated communication speed or rate T on connection 112a. Although particular commands are mentioned above for purposes of illustration, generally, any suitable command(s) may be used to provide and communicate each of the data storage systems. In at least one embodiment, the host may issue a command over each such path from an initiator port of the host, through the switch, and to the target port of the data storage system for which a negotiated rate or speed is desired for the link between the target port and the switch.

As a third step S3, the MP driver 106 may send the negotiated speed or rate I of the link 110a between the initiator port of the host and the switch to the data storage system. In at least one embodiment, the negotiated speed or rate I of link 110a may be used, for example, for display on a user interface (UI) or other purposes in connection with system administration or data storage system management software.

The MP driver 106 may perform processing to determine whether there is a difference in negotiated speeds or rates I for 110a and T for 112a.

As a fourth step S4, the MP driver 106 may perform processing to determine whether it needs to limit, reduce or control the rate at which data is transmitted to the target data storage system 120 over the path 110a, 140, 112a. If the I speed or I rate on 110a is faster/greater than the T speed or rate on 112a, then the host (e.g., MP driver 106) may perform processing to limit the rate at which data is transmitted over the path 110a, 140 112a, to the data storage system 120, such as when issuing writes over such path to system 120. In this example, the MP driver 106 120 may compare the I speed or I rate over 110a to the T speed or T rate of over 112a and determine that I speed or I rate is greater than T speed or T rate thereby indicating that the MP driver 106 limits or controls the rate at which data is written via write I/Os issued to system 120 over the path 110a, 140, 112a. In at least one embodiment, the MP driver 106 may limit the rate at which write data is sent to the data storage system 120 in accordance with the T speed or T rate 112a. For example, the host may limit the rate at which write data is sent to data storage system such that the average data bandwidth or transfer rate at which write data is sent from host 102 to data storage system 120 does not exceed the T speed or T rate of system 120 on connection 112a. In this manner, the T speed or T rate communicated from data storage system 120 to host 102 may be used as an upper bound or threshold data transfer rate that should not, on average, be exceeded. In at least one embodiment, the foregoing comparison of communication speeds or rates may further be performed with respect to a specified minimum threshold amount denoting that processing to limit, reduce or control the rate at which data is transmitted to the data storage system 120 over 112a is performed if the I rate or I speed exceeds the T rate or T speed, by at least the specified minimum threshold amount.

In such an embodiment, the host 102, such as the MP I/O driver 106, may have one or more control means by which it can control and limit the speed (e.g., rate or bandwidth) of data transmitted to data storage system 120 so that the observed speed or rate of data transmission does not exceed the T rate or T speed. Generally, the MP driver 106 may use any suitable means to control or limit the I/O rates (e.g., I/Os per second) and/or data transfer rate (e.g., MBs/second) sent to a particular target port of the data storage system from a particular initiator port of the host (e.g., MP driver 106 has the ability to control or limit the speed or rate or data transmission on a per path basis). For example, in at least one embodiment, the MP driver 106 may control the rate at which data is transmitted to data storage system 120 by introducing additional delays between consecutive write I/Os writing data from host 102 to the data storage system 120 over the path 110a, 140, 112a. For example, assume there are 3 write I/Os each which write 32 MBs of data. The MP driver 106 may introduce additional delays between the first and second write I/Os and also between the second and third write I/Os so that the average write data/payload bandwidth over a period of time does not exceed the T speed or T rate of 8 MB/second in this example. For example, the MP driver 106 may issue the first write that writes 32 MB of data/payload and then wait at least 4 seconds prior to issuing the second write that writes 32 MB of data/payload. In a similar manner, the MP driver 106 may issue the second write that writes 32 MB of data/payload and then wait at least 4 second prior to issuing the third write that writes 32 MB of data/payload. In this manner, the average rate at which write data payload is transmitted does not exceed 32 MB/4 seconds, which is 8 MB/second (the T speed or T rate). As another second technique, the MP driver 106 may vary the size or amount of write data per write I/O or may reduce the size of individual data portions in each data transmission from the host 102 to data storage system 120. In this second technique, the MP driver 106 may partition one or more write I/Os into multiple smaller I/Os which are issued at a suitable rate or frequency so that the average rate at which write data payload is transmitted to the data storage system 120 does not exceed the T speed or T rate. For example, assume the MP driver 106 issues 3 write I/Os each with a write data payload of 32 MB. In connection with this second technique, the MP driver 106 may partition the first original application write of 32 MB into 4 smaller write I/Os, each which write 8 MB. With this second technique, the MP driver 106 may issue each of the 4 smaller write I/Os (of 8 MB each) at consecutive 1 second intervals whereby the average rate at which write data payload is transmitted to system 120 is 8 MB/second and does not exceed the T speed or T rate (which is also 8 MB/second in this example). Generally, the MP driver 106 may partition each of the original writes into any suitable number of smaller write I/Os of any suitable size and may issue the smaller write I/Os at a suitable frequency or rate so that the average rate at which write data payload is transmitted to data storage system 120 over a larger time period is 8 MB/second and does not exceed the T speed or T rate. The amount of delay introduced between consecutive write I/Os and/or the size of the write I/Os may be selected so that the average measured or observed data transfer rate (e.g., such as in GBs/second) of the migrated data does not exceed the specified maximum threshold, T speed or T rate. In connection with such techniques as discussed above, there may be a temporary pooling and use of buffers 241 in the switch 140 until the data storage system 120 is able to drain write data therefrom. The MP driver 106 limits and controls the amount of write data transmitted during a time period thereby allowing the data storage system the chance to drain the write data from the buffers of switch 140 without constantly overwhelming the switch with excessive write data.

The slow drain problem or scenario may also occur in situations where the data storage system 120 is sending data to the host 102 and the T speed or T rate 112a is greater than the I speed or I rate 110a. For example, the T speed or T rate may be 16 GBs/second and the I speed or I rate may be 8 GBs/second. The slow drain problem or scenario may occur, for example, in connection with the data storage system 120 returning requested data, such as read I/O data requested by the host 102.

In connection with techniques herein, in a fifth step S5 the MP driver 106 may perform processing to determine whether the T speed or T rate (e.g., speed or rate of data transmission on 112a between the switch 140 and data storage system 120) is greater than the I speed or I rate (e.g., speed or rate of data transmission on 110a between switch 140 and host 102). In at least one embodiment, the foregoing comparison of communication speeds or rates may further be performed with respect to a specified minimum threshold amount denoting that processing to limit, reduce or control the rate at which data is transmitted from the data storage system 120 over 112*a* is performed if the T rate or T speed exceeds the I rate or I speed, by at least the specified minimum threshold amount.

It should be noted that step S5 may be omitted if step S4 has been performed.

In connection with step S5, if the T speed or T rate is greater than the I speed or I rate, the MP driver 106 of the host 102 may perform processing to reduce, control or limit the speed or rate at which the data storage system 120 returns data to the host over the path. In at least one embodiment, the MP driver 106 may instruct or request that the data storage system 120 limit the data transmission rate or speed at which data is sent to the host 102 by limiting the data transmission rate or speed from the data storage system 120 to switch 140 over connection 112*a* to not exceed a specified maximum threshold, such as the I speed or I rate. In such an embodiment in a manner similar to that as discussed above, the data storage system 120 may have one or more control means by which it can control and limit the speed (e.g., rate or bandwidth) of data transmitted to host 102. For example, the data storage system 120 may have a configurable control parameter that can be set to the desired limit denoting the maximum threshold rate or speed (e.g., can set parameter to I speed or I rate) at which the data storage system 120 sends returned read data to the host over 112*a*. Thus, such a parameter may be used to control the rate and limit the amount of port bandwidth of system 120 on 112*a* used in connection with sending requested data (e.g., such as read data) to the host from the data storage system 120. In this manner, the MP driver may set a per target port bandwidth limit.

In at least one embodiment, the MP driver may instruct or request the data storage system 120 limit the speed or rate at which data is sent to the initiator port of the host over 112*a* by issuing a command to the data storage system. As described above in connection with step S2, in at least one embodiment the command may be VU SCSI command or an existing SCSI command that has a VU page of information. For example, the MP driver may send a SCSI log select command to the data storage system 120. The command may include parameter information including a parameter denoting the maximum threshold rate or speed, I rate or I speed. In response to receiving the log select command with the maximum threshold rate or speed, the data storage system 120 may set one or more configurable parameters that limit and control the speed or rate at which data is transmitted over 112*a* to the host 102.

Additionally, an embodiment in accordance with techniques herein may use any suitable means to control and limit the speed or rate of data transmission to host 102 from the data storage system 120, such as over 112*a*, so that the observed speed or rate of data transmission does not exceed the specified maximum threshold of I rate or I speed. For example, the data storage system 120 may introduce delays between consecutive points in time at which read data is returned from system 120 to host 102 over 112*a* and/or varying the size or amount of read data returned at each point in time to the host 102 from system 120 over 112*a*. For example, assume the data storage system 120 is returning read data requested in connection with 3 read I/Os from the host 102 where each read I/O reads 32 MBs of data. The system 120 may introduce additional delays between the read data returned for the first and second read I/Os and also between the second and third reads I/Os so that the average returned read data bandwidth over a period of time does not exceed the I speed or I rate of 8 MB/second in this example. For example, the data storage system 120 may return the first read I/O's 32 MB of data/payload and then wait at least 4 seconds prior to returning the 32 MB of requested read data for the second read. In a similar manner, the data storage system 120 may return 32 MB of read data for the second read I/O and then wait at least 4 seconds prior to returning the 32 MB of requested read data for the third read I/O. In this manner, the average rate at which read data is transmitted/returned to the host 102 over the path does not exceed 32 MB/4 seconds, which is 8 MB/second (the I speed or I rate). As another second technique, the initiator may vary the size or amount of read data returned at different points in time by returning smaller chunks of read data to host 102 from data storage system 120. In this second technique, data storage system 120 may partition the original read I/O data payload into multiple smaller chunks which are returned at a suitable rate or frequency so that the average rate at which read data payload is transmitted from the system 120 to the host 102 does not exceed the I speed or I rate. For example, assume the MP driver 106 issues 3 read I/Os each requesting to read 32 MB of data. In connection with this second technique, the system 120 may partition the requested read data for the first original read of 32 MB into 4 smaller chunks of 8 MB each. With this second technique, the data storage system may return each of the 4 smaller read data chunks (of 8 MB each) at consecutive 1 second intervals whereby the average rate at which read data payload is transmitted to host 102 is 8 MB/second and does not exceed the I speed or I rate (which is also 8 MB/second in this example). Generally, the data storage system 120 may partition each of the original read I/O data payloads into any suitable number of smaller chunks of any suitable size and may return to the host 102 the smaller read data chunks at a suitable frequency or rate so that the average rate at which read data payload is transmitted from system 120 over a larger time period is 8 MB/second and does not exceed the I speed or I rate. The amount of delay introduced between consecutive points in time at which read data is returned and/or the size of each set of returned read data may be selected so that the average measured or observed data transfer rate (e.g., such as in GBs/second) does not exceed the specified maximum threshold, I speed or I rate.

In a sixth step S6, the MP driver 106 may report to the data storage system regarding the bandwidth limit enforced for each particular link between an initiator port of the host 102 and switch 140. For example, the MP driver may report, to the data storage system, the bandwidth limit enforced on 110*a*. Such information may be reported to the data storage system in S6 in connection with, for example, a data storage system management application that may display the bandwidth limit in a UI of the application (e.g., in a manner similar to that as described in connection with S3).

In at least one embodiment, the processing just described as related to steps S1-S6 may be repeated when there is a change in state with respect to the network (e.g., SAN), or more generally, communications fabric used in connection with communications between the host 102 and data storage system 120. In at least one embodiment, the MP driver 106 may not be able to directly detect such a state change to trigger repeating the processing of steps S1-S6. To solve the foregoing with respect to the MP driver 106, processing may be performed using features of the data storage system 120. In at least one embodiment, the data storage system may monitor and/or be notified regarding the occurrence of a state change with respect to the communications fabric and will record information regarding the occurrence of such an event. The information recorded may include the date/time of the state change in the communication fabric. For example, the data storage system, such as target ports thereof, may be notified regarding the occurrence of a state change in the communications fabric such as using the registered state change notification (RSCN) notification with an FC fabric.

The MP driver may periodically poll the target ports of the data storage system to learn whether and when a state change to the communication fabric has occurred. In at least one embodiment, the MP driver may perform such polling using one or more SCSI commands issued to the data storage system. For example, the MP driver may issue a SCSI Log Sense command with a VU page to request that the data storage system (e.g., target port thereof) return information regarding any occurrence with respect to a state change in the communications fabric. In at least one embodiment, the MP driver may trigger repeating steps S1-S6 in response to determining that a state change to the communications fabric has occurred recently, such as within a specified amount of time with respect to the current time (e.g., within the last few second). If so, the MP driver may repeat the processing as described above to make sure no adjustments are needed with respect to bandwidth limits on 110a and 112a.

State changes with respect to the communications fabric may include any of, for example, a change in zoning such as adding or deleting a port of the host, switch or data storage system. The change in state may be triggered by a change in log in state with respect to a target port or host initiator port logging into or out of the switch 140. The state change may include modifying a characteristic of an existing initiator port of the host, modifying a characteristic of an existing target port of the data storage system, modifying a characteristic of an existing port of the switch, and a component joining or leaving the communications fabric.

An embodiment in accordance with techniques herein may use the masking views as described herein. Generally, in connection with commands sent by the MP driver as described herein, any suitable command may be used although particular ones are provided for example and illustration. For example, in an embodiment as described herein using SCSI commands, a VU command or an existing command (e.g., log sense, log select, mode sense, mode select) with a VU page may be used to communicate the information used in connection with techniques herein.

Figure 7:
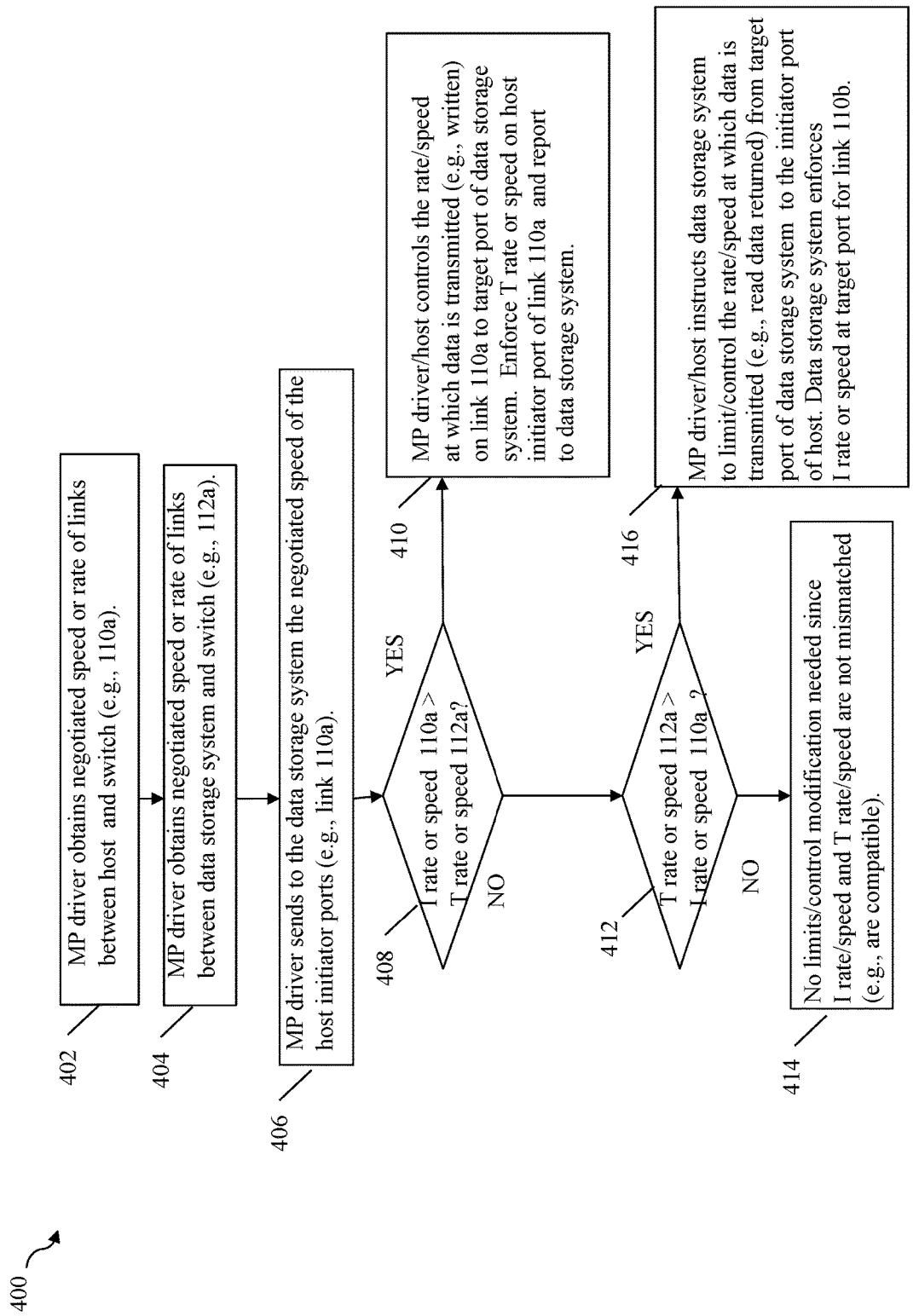
FIGS. 7 and 8 are flowcharts of processing steps that may be performed in an embodiment in accordance with techniques herein.

Referring to FIG. 7, shown is a first flowchart 400 of processing steps that may be performed in an embodiment in accordance with techniques herein. At step 402 (similar to S1 described above), the MP driver obtains the negotiated speed or rate of links between the host and switch (e.g., 110a). From step 402, control proceeds to step 404. At step 404 (similar to S2 described above), the MP driver obtains negotiated speed or rate of links between data storage system and switch (e.g., 112a). From step 404, control proceeds to 406. At step 406 (similar to S3), the MP driver sends to the data storage system the negotiated speed of the host initiator ports (e.g., link 110a). From step 406, control proceeds to step 408. At step 408 (similar to S4), a determination is made as to whether the I rate or speed is greater than the T rate or speed. If step 408 evaluates to yes, control proceeds to step 410. At step 410 also part of S4), the MP driver/host controls the rate or speed at which data is transmitted (e.g., written) on link 110a to the target port of data storage system. Thus, the MP driver enforces the T rate or speed on the host initiator port of link 110a. In step 410, the MP driver may report (as in S6) the enforced limit of T rate or speed to the data storage system. If step 408 evaluates to no control proceeds to step 412. At step 412 (similar to S5), a determination is made as to whether the T rate or speed is greater than the I rate or speed. If step 412 evaluates to yes, control proceeds to step 416. At step 416 (also part of S5), the MP driver/host instructs data storage system to limit/control the rate/speed at which data is transmitted (e.g., read data returned) on link 112a from the target port of data storage system to the initiator port of the host. The data storage system enforces the I rate or speed at target port of link 110b.

Figure 8:
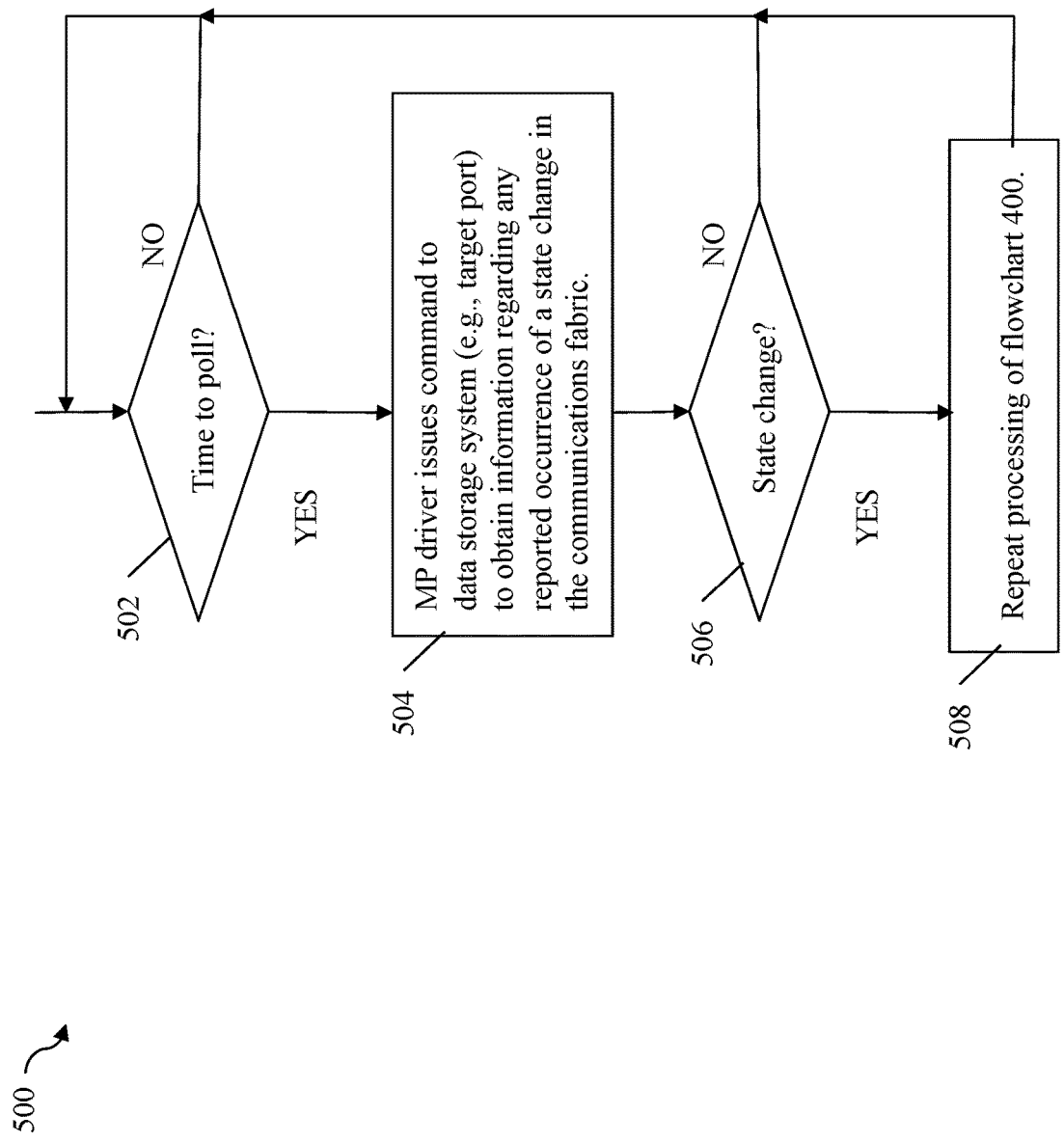

Referring to FIG. 8, shown is a second flowchart 500 of processing steps that may be performed in an embodiment in accordance with techniques herein. At step 502, a determination is made as to whether it is time for the MP driver or host to poll the data storage system. If step 502 evaluates to no, control remains at step 502 until step 502 evaluates to yes. If step 502 evaluates to yes, control proceeds to step 504. At step 504, MP driver issues command to the data storage system (e.g., target port) to obtain information regarding any reported occurrence of a state change in the communications fabric. From step 504, control proceeds to step 506 where a determination is made as to whether there has been a state change in the communications fabric. If step 506 evaluates to no, control proceeds to step 502. If step 506 evaluates to yes, control proceeds to step 508 where the processing of flowchart 400 of FIG. 7 is repeated.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of transmitting data comprising:
   receiving, at a host, an initiator data transfer rate indicating a communication rate at which an initiator port of the host communicates over a first path using a communications fabric with a target port of a data storage system;
   receiving, at the host, a target data transfer rate indicating a communication rate at which the target port of the data storage system communicates over the first path using the communications fabric with the initiator port of the host;
   determining, at the host, whether the initiator data transfer rate and the target data transfer rate are different;
   responsive to determining that the initiator data transfer rate and the target data transfer rate are different, performing first processing that controls and limits a rate at which data is transmitted between the initiator port and the target port in accordance with the initiator data transfer rate and the target data transfer rate;
   determining, by the host, whether there has been a state change with respect to the communications fabric used for communications between the host and data storage system; and
   responsive to determining there has been a state change with respect to the communications fabric used for communications between the host and data storage system, performing other processing by the host including:

receiving, at the host, a first revised value for the initiator data transfer rate and a second revised value for the target data transfer rate;

determining, at the host, whether the first revised value and the second revised value are different; and responsive to determining that the first revised value and the second revised value are different, performing additional processing that controls and limits a rate at which data is transmitted between the initiator port and the target port in accordance with the first revised value and the second revised value.

2. The method of claim 1, further comprising:

determining whether the initiator data transfer rate is greater than the target data transfer rate; and responsive to determining the initiator data transfer rate is greater than the target data transfer rate, performing second processing by the host that controls and limits, in accordance with the target data transfer rate, a rate at which data is transmitted from the host initiator port to the target port over the first path using the communications fabric.

3. The method of claim 2, further comprising:

issuing, from the initiator port of the host to the target port of the data storage system over the first path using the communications fabric, one or more write operations that stores write data on a storage device of the data storage system.

4. The method of claim 3, where the second processing includes the host limiting and controlling, in accordance with the target data transfer rate, a rate at which the one or more write I/O operations and an amount of the write data written by the one or more write I/O (input/output) operations are transmitted from the initiator port of the host to the target port of the data storage system over the first path using the communications fabric.

5. The method of claim 3, wherein the host sends the one or more write I/O operations at a frequency whereby an average write data transfer rate of the write data written by the one or more write I/O operations does not exceed the target data transfer rate.

6. The method of claim 3, wherein the second processing includes:

partitioning a first of the one or more write I/O operations that writes first data having a first size into multiple write I/O operations each of a smaller size than the first size; and issuing the multiple write I/O operations, from the initiator port of the host to the target port of the data storage system over the first path using the communications fabric, at a selected frequency whereby an average write data transfer rate of the first data written by the multiple write I/O operations does not exceed the target data transfer rate.

7. The method of claim 1, further comprising:

determining whether the target data transfer rate is greater than the initiator data transfer rate; and responsive to determining the target data transfer rate is greater than the initiator data transfer rate, performing second processing by the host that controls and limits, in accordance with the initiator data transfer rate, a rate at which data is transmitted from the target port to the host initiator port over the first path using the communications fabric.

8. The method of claim 7, further comprising:

issuing, from the host to the data storage system, a command that sets a bandwidth limit parameter of the data storage system to the initiator data transfer rate, wherein the bandwidth limit parameter denotes a rate at which data is transmitted from the target port of the data storage system to the initiator port of the data storage system over the first path using the communications fabric.

9. The method of claim 8, further comprising:

issuing, from the initiator port of the host to the target port of the data storage system over the first path using the communications fabric, one or more read operations reading read data from a storage device of the data storage system.

10. The method of claim 9, where the second processing includes the data storage limiting and controlling, in accordance with the initiator data transfer rate, a rate at which the read data read by the one or more read I/O operations is transmitted from the target port of the data storage system to the initiator port of the host over the first path using the communications fabric.

11. The method of claim 9, wherein an average read data transfer rate at which the data storage system sends the read data, from the target port of the data storage system to the initiator port of the host over the first path using the communications fabric, does not exceed the initiator data transfer rate.

12. The method of claim 11, wherein the data storage system performs processing to ensure that the average read data transfer rate does not exceed the initiator data transfer rate, said processing including any one or more of: controlling a frequency at which portions of the read data are returned to the initiator port, and controlling an amount of the read data returned in a single transmission to the initiator port.

13. The method of claim 1, wherein the communications fabric includes a switch having memory used as a buffer for temporarily storing data transmitted between the host and the data storage system.

14. The method of claim 13, wherein the state change includes any of: adding a new initiator port of the host, adding a new target port of the data storage system, adding a new port of the switch, removing an existing initiator port of the host, removing an existing target port of the data storage system, removing an existing port of the switch, modifying a characteristic of an existing initiator port of the host, modifying a characteristic of an existing target port of the data storage system, modifying a characteristic of an existing port of the switch, a new login to the switch, a logout of the switch, and a component joining or leaving the communications fabric.

15. The method of claim 1, further comprising:

receiving, by the data storage system, notification regarding the state change; and responsive to receiving the notification, performing processing on the data storage system to record information regarding the notification and associated state change, the information including a data and time of the state change.

16. The method of claim 15, wherein said determining, by the host, whether there has been a state change with respect to the communications fabric used for communications between the host and data storage system, further includes the host periodically polling the data storage system to determine whether there has been a state change with respect to the communications fabric.

17. The method of claim 1, wherein a multi-path I/O driver of the host receives the initiator data transfer rate and the target data transfer rate, and wherein the multi-path I/O driver performs said determining whether the initiator data transfer rate and the target data transfer rate are different, and wherein, responsive to determining that the initiator data transfer rate and the target data transfer rate are different, the multi-path I/O driver controls the first processing performed that controls and limits a rate at which data is transmitted between the initiator port and the target port in accordance with the initiator data transfer rate and the target data transfer rate.

18. A non-transitory computer readable medium comprising code stored thereon that, when executed, performs a method of transmitting data comprising:
   receiving, at a host, an initiator data transfer rate indicating a communication rate at which an initiator port of the host communicates over a first path using a communications fabric with a target port of a data storage system;
   receiving, at the host, a target data transfer rate indicating a communication rate at which the target port of the data storage system communicates over the first path using the communications fabric with the initiator port of the host;
   determining, at the host, whether the initiator data transfer rate and the target data transfer rate are different;
   responsive to determining that the initiator data transfer rate and the target data transfer rate are different, performing first processing that controls and limits a rate at which data is transmitted between the initiator port and the target port in accordance with the initiator data transfer rate and the target data transfer rate;
   determining, by the host, whether there has been a state change with respect to the communications fabric used for communications between the host and data storage system; and
   responsive to determining there has been a state change with respect to the communications fabric used for communications between the host and data storage system, performing other processing by the host including:
      receiving, at the host, a first revised value for the initiator data transfer rate and a second revised value for the target data transfer rate;
      determining, at the host, whether the first revised value and the second revised value are different; and
      responsive to determining that the first revised value and the second revised value are different, performing additional processing that controls and limits a rate at which data is transmitted between the initiator port and the target port in accordance with the first revised value and the second revised value.

19. A system comprising:
one or more processors; and
a memory comprising code stored thereon that, when executed, performs a method of transmitting data comprising:
   receiving, at a host, an initiator data transfer rate indicating a communication rate at which an initiator port of the host communicates over a first path using a communications fabric with a target port of a data storage system;
   receiving, at the host, a target data transfer rate indicating a communication rate at which the target port of the data storage system communicates over the first path using the communications fabric with the initiator port of the host;
   determining, at the host, whether the initiator data transfer rate and the target data transfer rate are different;
   responsive to determining that the initiator data transfer rate and the target data transfer rate are different, performing first processing that controls and limits a rate at which data is transmitted between the initiator port and the target port in accordance with the initiator data transfer rate and the target data transfer rate;
   determining, by the host, whether there has been a state change with respect to the communications fabric used for communications between the host and data storage system; and
   responsive to determining there has been a state change with respect to the communications fabric used for communications between the host and data storage system, performing other processing by the host including:
   receiving, at the host, a first revised value for the initiator data transfer rate and a second revised value for the target data transfer rate;
      determining, at the host, whether the first revised value and the second revised value are different; and
      responsive to determining that the first revised value and the second revised value are different, performing additional processing that controls and limits a rate at which data is transmitted between the initiator port and the target port in accordance with the first revised value and the second revised value.

* * * * *